United States Patent [19]

Payne et al.

[11] Patent Number: 4,944,548
[45] Date of Patent: Jul. 31, 1990

[54] SIDE WINDOW SHADE FOR AUTOMOBILES

[76] Inventors: George E. Payne; Doris P. Payne, both of 1121 Prescott, Memphis, Tenn. 38111

[21] Appl. No.: 396,062
[22] Filed: Aug. 21, 1989
[51] Int. Cl.⁵ ............................................. B60J 3/00
[52] U.S. Cl. ............................... 296/97.8; 296/97.7; 160/370.2; 160/84.1
[58] Field of Search ............... 296/97.1, 97.8, 97.7, 296/97.9; 248/205.5, 205.8, 316.5, 231.5; 160/370.2, 84.1, 354, DIG. 2, DIG. 3

[56] References Cited

U.S. PATENT DOCUMENTS

| D. 302,107 | 7/1989 | Adams | 248/205.8 X |
|---|---|---|---|
| 1,587,144 | 6/1926 | Burk | 296/97.7 X |
| 2,210,762 | 8/1940 | Itzigson | 296/97.9 |
| 2,925,302 | 2/1960 | Bosch | 296/97.7 |
| 3,025,098 | 3/1962 | Andrews | 296/97.7 X |
| 3,241,795 | 3/1966 | Frye | 248/205.5 X |
| 3,282,623 | 11/1966 | Paro . | |
| 3,369,838 | 11/1968 | Nelson . | |
| 3,511,365 | 5/1970 | Dow | 296/97.7 X |
| 3,545,805 | 12/1970 | Wilson | 248/316.5 X |
| 4,202,396 | 5/1980 | Levy | 296/97.7 X |
| 4,468,062 | 8/1984 | Marcus et al. . | |
| 4,607,875 | 8/1986 | McGirr | 296/97.7 |
| 4,647,102 | 3/1987 | Ebrahimzadeh . | |
| 4,758,042 | 7/1988 | Liu . | |
| 4,823,859 | 4/1989 | Park | 160/370.2 |
| 4,838,335 | 6/1989 | Eskandry et al. | 296/97.7 X |
| 4,840,341 | 6/1989 | Hasegawa | 248/316.5 |

FOREIGN PATENT DOCUMENTS

| 475317 | 4/1929 | Fed. Rep. of Germany ... | 248/205.5 |
|---|---|---|---|
| 579356 | 7/1946 | United Kingdom ............ | 248/231.5 |

Primary Examiner—Margaret A. Focarino
Assistant Examiner—Joseph D. Pape
Attorney, Agent, or Firm—Jerry T. Kearns

[57] ABSTRACT

A side window shade for automobiles is formed from a panel having a plurality of sections connected by double folding joints. An upper edge of the panel is configured with a curvature corresponding to an automobile side window frame and includes a plurality of spaced notches which removably receives suction cup retainers for securing the panel to an automobile side window. The panel may be formed from a white corrugated cardboard material or may be at least partially formed from a tinted transparent material to allow visibility through the side window. The suction cup retainers each include a pair of pivotally connected jaw members and a spring which biases the jaw members to a closed position. Aligned clamping portions of the jaw members are each provided with a friction enhancing pad for engagement with the panel. A suction cup is secured to one of the jaw members for engagement with an automobile window and a tab is provided on a back surface of the suction cup for manually releasing the suction cup from a window.

1 Claim, 3 Drawing Sheets

SIDE WINDOW SHADE FOR AUTOMOBILES

BACKGROUND OF THE INVENTION

1. Field of the Invention

The present invention relates to window shades for automobiles, and more particularly pertains to a window shade particularly adapted for use on a side window of an automobile. Window shades formed from hingedly connected cardboard panels are currently enjoying wide spread popularity. These panels may be folded to a compact position for convenient storage and extended to an operative position for covering the windshield of a vehicle. These conventional shades substantially reduce ultraviolet damage to a vehicle interior and maintain the vehicle interior at a lower temperature when the vehicle is parked in the sun. The present invention provides a window shade which may be utilized on side windows of a vehicle, while the vehicle is being driven or when the vehicle is parked.

2. Description of the Prior Art

Various types of window shades for automobiles are known in the prior art. A typical example of such a window shade for automobiles is to be found in U.S. Pat. No. 3,282,623, which issued to F. Paro on Nov. 1, 1966. This patent discloses an extensible sun visor having a rectangular extensible shade secured by a pivotal bracket to a suction cup retainer for securement on a side vehicle window. U.S. Pat. No. 3,369,838, which issued to K. Nelson on Feb. 20, 1968, discloses an extensible sun visor formed from a plurality of hingedly interconnected sections. U.S. Pat. No. 4,468,062, which issued to K. Marcus et al on Aug. 28, 1984, discloses a side window shade including a mounting structure adapted for securement to the headliner of a vehicle above a side window. A pair of parallel spaced arms are pivotally coupled to one end of the mounting structure and have opposite ends pivotally secured to a sun shield allowing the shield to be pivoted by rotation of the parallel arms between raised and stored positions. U.S. Pat. No. 4,647,102, which issued to M. Ebrahimzadeh on Mar. 3, 1987, discloses a removable curtain assembly for covering the inside of a vehicle windshield including an white corrugated vertically pleated panel. The device includes a plurality of spaced suction cups for engagement with the interior surface of a vehicle windshield. U.S. Pat. No. 4,758,042, which issued to C. Liu on July 19, 1988, discloses a collapsible sunshade which utilizes a plurality of suction cups for engagement with the interior surface of a vehicle windshield.

While the above mentioned devices are directed to window shades for automobiles, none of these devices disclose a side window shade for automobiles including a panel having a plurality of sections connected by folding joints and having an upper edge provided with a plurality of spaced notches removably receiving suction cup retainers having spring biased pivotally connected jaw members. Additionally, none of the aforementioned devices disclose the use of suction cup retainers having a tab on a back surface of a suction cup for manually releasing the suction cup from an automobile window. Inasmuch as the art is relatively crowded with respect to these various types of window shades for automobiles, it can be appreciated that there is a continuing need for and interest in improvements to such window shades for automobiles, and in this respect, the present invention addresses this need and interest.

SUMMARY OF THE INVENTION

In view of the foregoing disadvantages inherent in the known types of window shades for automobiles now present in the prior art, the present invention provides an improved side window shade for automobiles. As such, the general purpose of the present invention, which will be described subsequently in greater detail, is to provide a new and improved side window shade for automobiles which has all the advantages of the prior art window shades for automobiles and none of the disadvantages.

To attain this, a representative embodiment of the concepts of the present invention is illustrated in the drawings and makes use of a side window shade for automobiles which is formed from a panel having a plurality of sections connected by double folding joints. An upper edge of the panel is configured with a curvature corresponding to an automobile side window frame and includes a plurality of spaced notches which removably receives suction cup retainers for securing the panel to an automobile side window. The panel may be formed from an white corrugated cardboard material or may be at least partially formed from a tinted transparent material to allow visibility through the side window. The suction cup retainers each include a pair of pivotally connected jaw members and a spring which biases the jaw members to a closed position. Aligned clamping portions of the jaw members are each provided with a friction enhancing pad for engagement with the panel. A suction cup is secured to one of the jaw members for engagement with an automobile window and a tab is provided on a back surface of the suction cup for manually releasing the suction cup from a window.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved side window shade for automobiles which has all the advantages of the prior art window shades for automobiles and none of the disadvantages.

It is another object of the present invention to provide a new and improved side window shade for automobiles which may be easily and efficiently manufactured and marketed.

It is a further object of the present invention to provide a new and improved side window shade for automobiles which is of a durable and reliable construction.

An even further object of the present invention is to provide a new and improved side window shade for automobiles which is susceptible of a low cost of manufacture with regard to both materials and labor, and which accordingly is then susceptible of low prices of sale to the consuming public, thereby making such window shades for automobiles economically available to the buying public.

Still yet another object of the present invention is to provide a new and improved side window shade for automobiles which provides in the apparatuses and methods of the prior art some of the advantages thereof, while simultaneously overcoming some of the disadvantages normally associated therewith.

Still another object of the present invention is to provide a new and improved side window shade for automobiles to protect a vehicle interior from damaging ultra-violet radiation.

Yet another object of the present invention is to provide a new and improved side window shade for automobiles to maintain a vehicle interior at a cooler temperature.

Even still another object of the present invention is to provide a new and improved side window shade for automobiles which utilizes a suction cup retainer enabling convenient securement and release of the shade to a side window of an automobile.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
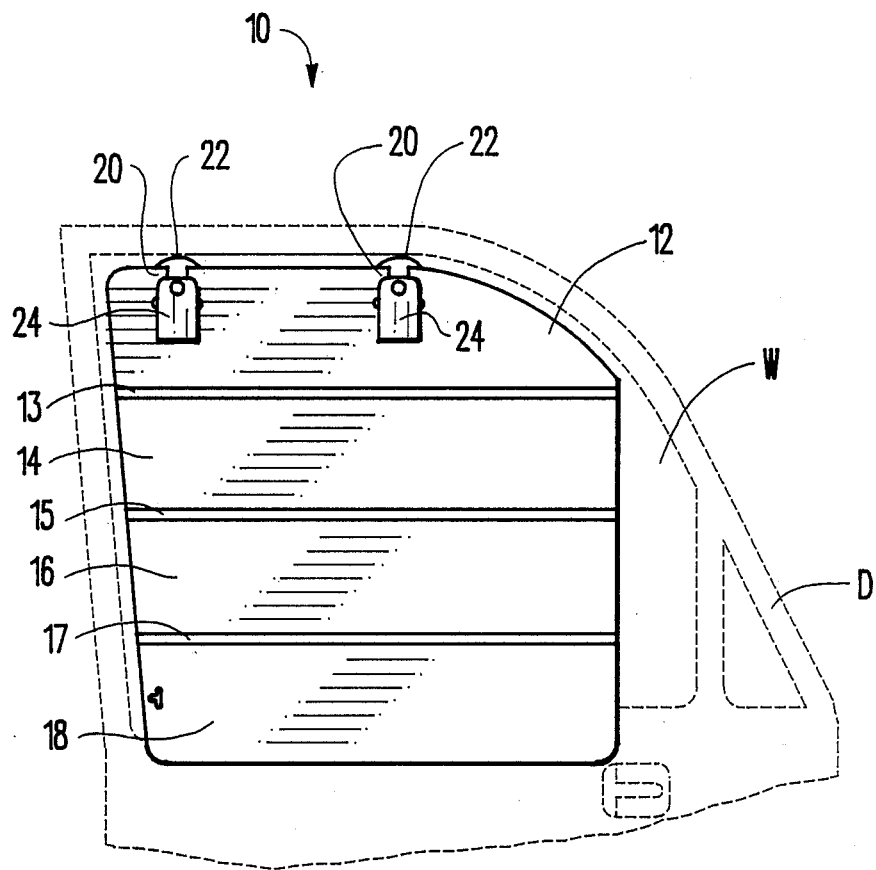
FIG. 1 is an interior side view of a vehicle side window provided with the window shade according to the present invention.

With reference now to the drawings, and in particular to FIG. 1 thereof, a new and improved side window shade for automobiles embodying the principles and concepts of the present invention and generally designated by the reference numeral 10 will be described.

More specifically, it will be noted that the first embodiment 10 of the invention includes a panel formed from a plurality of sections 12, 14, 16 and 18 connected by double folding joints 13, 15 and 17. The sections 12, 14, 16 and 18 may be formed from a white laminated corrugated cardboard material, or may be formed from a transparent tinted glass or plastic material. The folding joint portions may be reinforced with a flexible tape. Alternatively, some of the sections, or portions thereof, may be formed from a tinted transparent material, such as plastic or glass, while the remaining portions of the panel are formed from a white corrugated material. In this manner, a large portion of the sun's ultra-violet and infra-red rays are blocked from the interior of the vehicle, preventing damage to the vehicle interior and preventing the vehicle interior from becoming overheated. An upper edge of the top section 12 is configured with a curvature corresponding to an automobile side window frame. A plurality of spaced notches 20 are formed in the upper edge of the panel and suction cup retainers including suction cups 22 and a jaw member 24 are removably received in the notches 20 for securing the panel to an automobile side window W within a vehicle door D.

Figure 2:
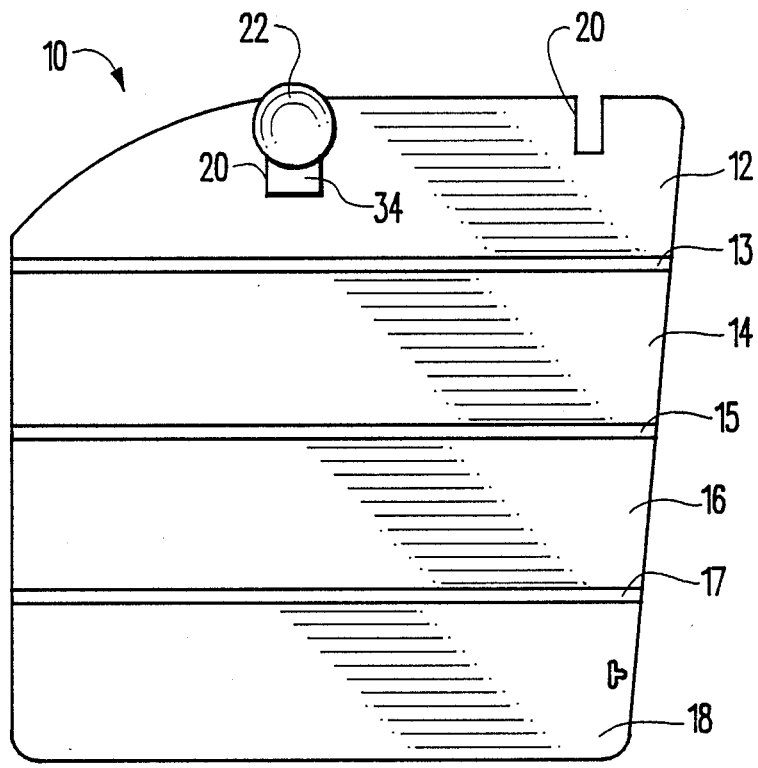
FIG. 2 is an opposite side view of the window shade of FIG. 1.

FIG. 2 illustrates an opposite side view of the window shade 10 which illustrates a second jaw member 34 secured to the suction cup 22 and engaged in the notch 20.

Figure 3:
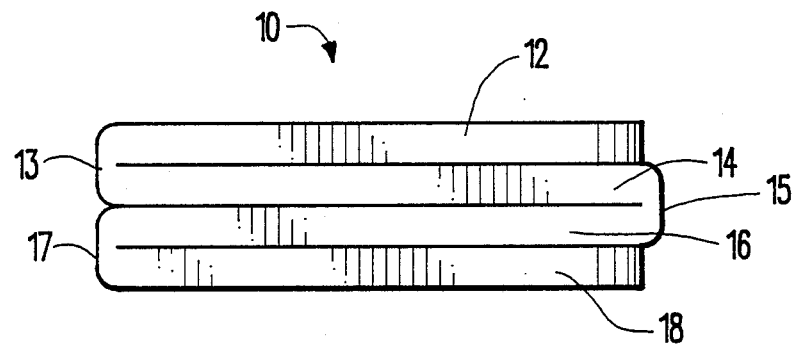
FIG. 3 is an end view illustrating the window shade of FIG. 1 folded to a storage position.

As shown in FIG. 3, the sections 12, 14, 16 and 18 may be folded in overlying relation by virtue of the double folding joints 13, 15 and 17. This allows the shade to be stored in a compact configuration when not in use.

Figure 4:
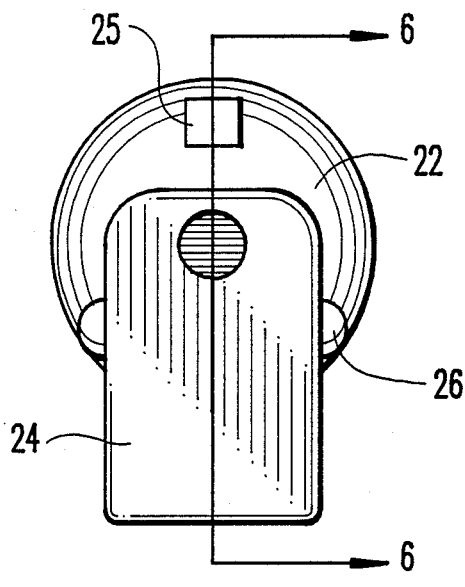
FIG. 4 is a back view illustrating the suction cup retainer utilized to secure the window shade of the present invention to an automobile side window.

FIG. 4 is a back view illustrating a first jaw member 24, a pivot pin 26 and the suction cup 22 provided with a tab member 25 on a back surface to facilitate manual disengagement of the suction cup 22 from a window surface.

Figure 5:
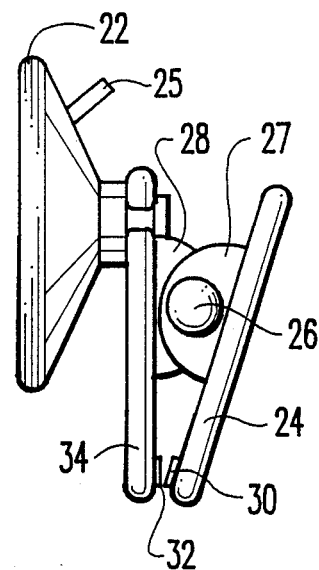
FIG. 5 is a side view of the suction cup retainer of FIG. 4.

FIG. 5 illustrates a side view of the suction cup retainer of FIG. 4, and further depicts yoke portions 27 and 28 of the jaw members 24 and 34 through which the pivot pin 26 is received. The suction cup 22 is secured to the jaw member 34 and friction enhancing pads 32 and 30 are disposed on clamping portions of the jaws 34 and 24 for engagement with the window shade panel. The friction enhancing pads 30 and 32 may comprise serrated plastic or metal strips, or an abrasive material such as sand paper.

Figure 6:
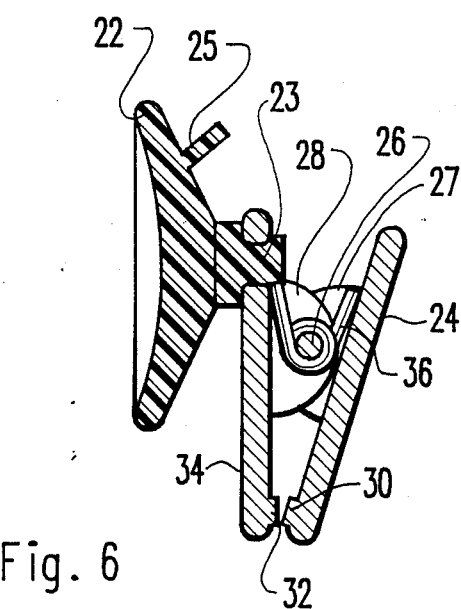
FIG. 6 is a longitudinal cross sectional view, taken along line 6—6 of FIG. 4.
Figure 7:
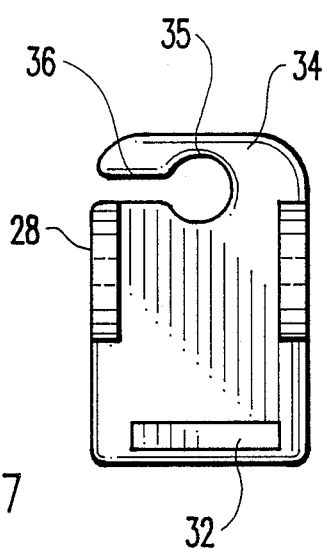
FIG. 7 is a detail view illustrating a portion of the suction cup retainer.

FIG. 6 is a cross sectional view, taken along line 6—6 of FIG. 4 which illustrates a torsional coil spring 36 received around the pivot pin 26 which biases the clamping jaws 24 and 34 to the illustrated closed position. The suction cup 22 includes an integral reduced diameter neck portion 23 which secures the suction cup 22 to the jaw member 34, via a lateral slot intersecting a circular aperture, as shown in FIG. 7. This construction allows the suction cup retainer to be disengaged from the window shade panel to allow folding to a compact storage position. Additionally, the suction cup retainers may be utilized to secure other items to automobile windows.

As shown in FIG. 7, the jaw member 34 includes a lateral slot which intersects a circular aperture 35. This construction allows removable securement of the suction cup to the jaw member 34 by lateral insertion of the suction cup neck portion 23 (FIG. 6).

As may now be understood, the present invention provides an easily installed portable window shade which protects a vehicle interior and vehicle occupants from the sun's infra-red and ultra-violet rays.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A side window shade for automobiles, comprising:

a panel having a plurality of sections connected by double folding joints;

an upper edge of said panel configured with a curvature corresponding to an automobile side window frame;

a plurality of spaced notches in said upper edge of said panel;

a suction cup retainer received in each of said notches for securing said panel to an automobile side window, said suction cup retainer including a pair of pivotally connected jaw members;

spring means biasing said jaw members to a closed position;

aligned clamping portions of said jaw members provided with abrasive friction enhancing pads for engagement with said panel;

a circular aperture formed in one of said jaw members, said circular aperture connected to a side edge of said jaw member by a lateral slot;

a suction cup having a cylindrical reduced diameter neck portion removably received in said circular aperture of said jaw member for engagement with an automobile side window; and a tab extending upwardly at an oblique angle from a frusto conical back surface of said suction cup for manually releasing said suction cup from an automobile side window.

* * * * *